(12) United States Patent
Seidl

(10) Patent No.: US 10,696,353 B2
(45) Date of Patent: Jun. 30, 2020

(54) MOTORCYCLE HAVING A FLUID-ACTUATED LOWERING DEVICE

(71) Applicant: Bayerische Motoren Werke Aktiengesellschaft, Munich (DE)

(72) Inventor: Josef Seidl, Strasskirchen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/254,808

(22) Filed: Jan. 23, 2019

(65) Prior Publication Data

US 2019/0152557 A1 May 23, 2019

Related U.S. Application Data

(63) Continuation of application No. PCT/EP2017/066883, filed on Jul. 6, 2017.

(30) Foreign Application Priority Data

Sep. 29, 2016 (DE) .................. 10 2016 218 787

(51) Int. Cl.
*B62K 25/08* (2006.01)
*B62K 25/28* (2006.01)
*B62K 25/04* (2006.01)

(52) U.S. Cl.
CPC ............ *B62K 25/283* (2013.01); *B62K 25/08* (2013.01); *B60G 2202/41* (2013.01);
(Continued)

(58) Field of Classification Search
CPC .............. B62K 25/283; B62K 25/08; B62K 2025/045; B62K 2025/048; B60G 2202/41; B60G 2300/12; B60G 2800/914
See application file for complete search history.

(56) References Cited

U.S. PATENT DOCUMENTS

| 3,524,657 A | 8/1970 | Yew et al. |
| 4,568,101 A * | 2/1986 | Bleustein ........... B60G 17/0152 180/219 |

(Continued)

FOREIGN PATENT DOCUMENTS

| CN | 2294912 Y | 10/1998 |
| CN | 1522928 A | 8/2004 |

(Continued)

OTHER PUBLICATIONS

International Search Report (PCT/ISA/210) issued in PCT Application No. PCT/EP2017/066883 dated Sep. 21, 2017 with English translation (eight pages).

(Continued)

*Primary Examiner* — Jacob D Knutson
*Assistant Examiner* — Marlon A Arce
(74) *Attorney, Agent, or Firm* — Crowell & Moring LLP

(57) ABSTRACT

A motor vehicle, in particular a motorcycle or a motorcycle-like vehicle, includes a wheel suspension supporting the vehicle frame with a spring assembly. The wheel suspension is designed to compress in a compression direction and to rebound in an opposite rebound direction. The wheel suspension includes a lowering device which can be selectively actuated by a pressure fluid in an active state to apply a preload to the wheel suspension to alter a ride height of the motor vehicle.

16 Claims, 3 Drawing Sheets

(52) U.S. Cl.
CPC .... *B60G 2300/12* (2013.01); *B60G 2800/914* (2013.01); *B62K 2025/045* (2013.01); *B62K 2025/048* (2013.01)

(56) References Cited

U.S. PATENT DOCUMENTS

| | | | |
|---|---|---|---|
| 5,215,327 | A | 6/1993 | Gatter et al. |
| 9,714,066 | B1 * | 7/2017 | Arnott .................... B62K 25/04 |
| 2004/0178599 | A1 | 9/2004 | Ozeki |
| 2015/0259028 | A1 * | 9/2015 | Ishikawa ................ B62K 25/08 280/6.152 |
| 2017/0246975 | A1 * | 8/2017 | Weldy ....................... B60P 1/18 |
| 2019/0270358 | A1 * | 9/2019 | Korrect ............. B60G 17/0525 |

FOREIGN PATENT DOCUMENTS

| | | |
|---|---|---|
| CN | 1535888 A | 10/2004 |
| DE | 40 01 601 A1 | 7/1991 |
| DE | 40 14 466 A1 | 11/1991 |
| DE | 102 39 140 A1 | 3/2004 |
| DE | 10 2004 013 559 A1 | 10/2005 |
| EP | 1 197 361 B1 | 8/2005 |
| EP | 1 577 125 A2 | 9/2005 |
| EP | 1 867 502 A1 | 12/2007 |
| WO | WO 2013/066159 A1 | 11/2012 |

OTHER PUBLICATIONS

German-language Written Opinion (PCT/ISA/237) issued in PCT Application No. PCT/EP2017/066883 dated Sep. 21, 2017 (five pages).

German-language Search Report issued in counterpart German Application No. 10 2016 218 787.2 dated Jun. 13, 2017 with partial English translation (13 pages).

English translation of Chinese Office Action issued in counterpart Chinese Application No. 201780043455.3 dated Dec. 18, 2019 (10 pages).

* cited by examiner

MOTORCYCLE HAVING A FLUID-ACTUATED LOWERING DEVICE

CROSS REFERENCE TO RELATED APPLICATIONS

This application is a continuation of PCT International Application No. PCT/EP2017/066883, filed Jul. 6, 2017, which claims priority under 35 U.S.C. § 119 from German Patent Application No. 10 2016 218 787.2, filed Sep. 29, 2016, the entire disclosures of which are herein expressly incorporated by reference.

BACKGROUND AND SUMMARY OF THE INVENTION

The invention relates to a motor vehicle, in particular a motorcycle or a vehicle similar to a motorcycle, having a vehicle suspension which is damped by means of a spring arrangement.

From the prior art, motorcycles are known with a height-adjustable chassis and enable an adjustment of the vehicle height using adjustable suspension struts, for example, for adapting to different vehicle states.

There is known, for example, under the name "Electronic Suspension Adjustment" (ESA) and "Dynamic ESA" an electronic chassis from the same Applicant. The adjustability affords the driver improvements with respect to road safety and performance. The damping of the suspension struts is in this instance adapted to the front wheel and rear wheel by means of electrically controlled adjustment valves in order to achieve a significantly improved contact between the road and tires. A lowering or raising of the travel position is carried out in this instance by means of corresponding adjustment of a respective spring base.

Furthermore, adjustment devices with adjustable telescope-like spring forks are known, such as, for example, from WO 2013/066159 A1. In contrast, a possible variant of an active rear wheel suspension is described in EP 1 197 361 B1.

In order, however, to achieve a very rapid adjustment of the chassis height, in particular raising from a lowered position back into a normal or raised travel position, with the known adjustment devices high levels of power are required in order to adjust the suspension struts counter to the gravitational force of the vehicle. In addition, the adjustment devices are partially structurally and functionally integrated in other vehicle components.

An object of the invention is therefore to provide a height adjustment for a vehicle, in particular a motorcycle or a vehicle similar to a motorcycle, which enables a rapid and easy adjustment and which additionally can be provided where possible independently of other vehicle components in the vehicle.

Accordingly, a motor vehicle is provided, in particular a motorcycle or a vehicle similar to a motorcycle, having a wheel suspension which is damped by means of a spring arrangement and which is constructed for compression in a compression direction and extension in an opposing extension direction. Furthermore, there is provided a lowering device which can be selectively actuated by means of a pressure fluid and which is constructed in an active state to act on the wheel suspension with a preload which is directed in the compression direction.

If the driver thus wishes to lower the vehicle height, he can actuate the lowering device which can be actuated in a selective manner. In the active state thereof, the wheel suspension is acted on with a force, the preload. This force is directed in the compression direction of the wheel suspension and results in the damped wheel suspension being compressed in the compression direction by a compression path which corresponds to the preload. The preload thus acts counter to the extension direction of the spring arrangement of the wheel suspension so that accordingly the spring arrangement is compressed by the preload and consequently shortened. This leads to a lowering of the vehicle and a corresponding height adjustment.

Expressed in other words, as a result of the preload a compression movement is forced through a defined compression path and a corresponding extension is reduced by the lowering device and the action as long as the lowering device is active. In the active state, the wheel suspension is pressed by the preload provided by the lowering device "into the suspension" of the wheel suspension and retained at that location in the pretensioned state in a balance of forces between preload and an opposingly directed extension force of the spring arrangement.

The lowering device provided is preferably constructed so as to be able to be operated separately and independently from the spring arrangement and introduces the preload directly into the wheel suspension. To this end, the lowering device is preferably directly connected to the wheel suspension. This arrangement affords the advantage that in principle no change or adaptation of the conventional components of a wheel suspension are required. Instead, the lowering device can be provided in addition to the existing components, in particular to the damped wheel suspension. For example, the lowering device may be constructed in a modular manner and may thus be able to be integrated or replaced in existing vehicles.

Preferably, the lowering device has for the actuation thereof an individual pressure fluid supply. A coupling to other pressure fluid circuits of the vehicle is possible, but preferably not necessary.

In any case, as a result of the operating principle via the action of the preload on the wheel suspension, a lowering of the vehicle height can be carried out in a very simple and rapid manner. The same applies in reverse for the return to the normal non-lowered vehicle height. This is achieved by a deactivation of the lowering device in which the action of the preload on the wheel suspension is removed again.

As soon as the action of the lowering device on the wheel suspension is removed (in the inactive state), the restoring forces of the separate spring arrangement act in an unlimited manner so that the vehicle extends simply as a result of the extension force resulting from the compression path and the original vehicle height can be adjusted directly and immediately.

A vehicle similar to a motorcycle is intended to be understood to be in particular all two-wheeled vehicles but also multi-wheel vehicles each having a corresponding saddle-like bench type seat for the user, in a particularly preferred manner, two-wheel, three-wheel or four-wheel motor scooters or scooters.

The pressure fluid is a pressurized fluid or a pressurized gas which is placed under excess pressure with respect to ambient pressure. Accordingly, different variants of the lowering device are possible, a hydraulic or a pneumatic or a combined embodiment of these two variants.

According to an embodiment, the lowering device which can be selectively actuated by means of a pressure fluid may comprise a hydraulically actuatable adjustment element, in particular a hydraulic cylinder. By supplying the pressurized fluid (pressure fluid for short), the adjustment element can accordingly be actuated and a resulting adjustment force which can act on the wheel suspension as a preload can be provided. In order to further enable the wheel suspension to damp, compress and extend, the hydraulic cylinder may further be resiliently connected to a vehicle frame or has a resiliently constructed piston rod.

Alternatively or additionally, the lowering device which can be selectively actuated by means of a pressure fluid may comprise an adjustment element which can be actuated pneumatically, in particular a pneumatic cylinder. By supplying the gaseous, pressurized fluid (pressure fluid for short), the adjustment element can be accordingly actuated and a resulting adjustment force which can act on the wheel suspension as a preload can be provided.

Furthermore, the damped wheel suspension may be constructed as a front wheel suspension for at least one front wheel, having an upper suspension portion and a lower suspension portion which can be moved relative thereto, wherein the spring arrangement comprises at least one spring damper element, which is connected with a first end to the lower suspension portion and with an opposing second end to the upper suspension portion in order to resiliently support the lower suspension portion on the upper suspension portion.

For example, such front wheel suspensions have a single suspension strut or a suspension fork having two suspension struts. In each case, a portion associated with the front wheel, the lower suspension portion, can be moved in a relative manner and is arranged by means of the spring damper element in a state damped with respect to the upper suspension portion.

For example, the adjustment element may be connected with a first end to the upper suspension portion and with a second end to the lower suspension portion in order to selectively act on the damped front wheel suspension with the preload. As a result of the arrangement, the adjustment element counteracts in the active state the movement of the spring damper element at least with respect to an extension movement and limits the extent of the movement thereof. For example, the adjustment element is connected with the first end to a fork bridge, in particular a lower fork bridge (as an upper suspension portion) and with the second end to a sliding tube bridge or an insertion tube bridge (as a lower suspension portion).

Alternatively or additionally, the damped wheel suspension may be constructed as a rear wheel suspension for at least one rear wheel and may comprise a rear wheel rocker arm which is connected to a vehicle frame so as to be able to be rotated about a first rotation axis, wherein the spring arrangement comprises at least one spring damper element which is connected with a first end to the rear wheel rocker arm and with an opposing second end to the vehicle frame to resiliently support the rear wheel rocker arm.

The at least one spring damper element represents, for example, the spring arrangement of the rear wheel rocker arm provided for regular travel operation. The connection of the second end of the respective spring damper element can be carried out either directly and without any intermediate member with the vehicle frame, or indirectly by means of one or more interposed connection element(s) which can themselves be connected directly or indirectly to the vehicle frame.

For example, the adjustment element can be connected with a first end to the vehicle frame and with a second end to the rear wheel rocker arm in order to selectively act on the rear wheel rocker arm with the preload.

At least in the active state, there is consequently preferably produced a support of the lowering device, on the one hand, on the vehicle frame and, on the other hand, on the wheel suspension, in the case of both a front wheel suspension and a rear wheel suspension. In this manner, an adjustment force produced by the adjustment element is used to provide the preload on the wheel suspension by being directed in the compression direction and consequently counter to a resilient force or counter to an extension movement of the separate spring arrangement. In the case of a pneumatic adjustment element, the resilient action is maintained as a result of the compressibility of the fluid. To this end, however, in the case of a hydraulic adjustment element, a connection to the vehicle frame or the piston rod of the adjustment element can be constructed in a resilient manner.

Furthermore, the adjustment element may be positioned below a rotation axis of the rear wheel suspension so that the preload which is directed in the compression direction is provided by a pressure force which is applied by the adjustment element. Alternatively, the adjustment element may be positioned above the rear wheel rocker arm so that the preload which is directed in a compression direction is provided by means of a tensile force which is applied by the adjustment element.

Of course, the vehicle may comprise not only a lowering device on an individual wheel suspension which is constructed either as a front wheel suspension or as a rear wheel suspension. Instead, the vehicle may have both an individual lowering device for a front wheel suspension and an individual lowering device for the rear wheel suspension, which is constructed in any case in accordance with the description.

Independently of a use for a front wheel suspension and/or a rear wheel suspension, the lowering device provided affords particular advantages. The adjustment element carries out as a result of the individual action of the pressure fluid an action on the wheel suspension which acts counter to the spring arrangement so that the damped wheel suspension is moved in the compression direction. In this manner, the vehicle is lowered or a vehicle height is reduced and the vehicle is retained in this position as long as the adjustment element is active. To this end, the adjustment element limits in this position a movement extent of the wheel suspension in the opposite direction, that is to say, an extension in the extension direction. This means that, although the wheel suspension can be compressed further, it cannot extend beyond a maximum extension position which is limited by the adjustment element and the preload. In the case of a pneumatic adjustment element, the resilient action is maintained as a result of the compressibility of the fluid. To this end, however, in the case of a hydraulic adjustment element, a connection to the vehicle frame or the piston rod of the adjustment element can be constructed in a resilient manner.

In other words, the adjustment element represents a defined, adjustable resilient stop for the wheel suspension so that the maximum extension path is limited. The adjustment element may either be adjustable in a single position or one of several defined positions, gradually or steplessly, in order to accordingly adjust and vary the maximum extension path.

Also independently of a use of the lowering device for a front wheel suspension and/or a rear wheel suspension, the lowering device may according to one embodiment comprise a compressor and/or volume store which is connected to the adjustment element in a fluid-conveying manner for actuating the adjustment element by means of the pressure fluid. This means that the pressure fluid is placed under pressure by the compressor and is supplied to the adjustment element. As a result of the application of pressure to the adjustment element, it is actuated and—depending on the embodiment—lengthened or shortened. Accordingly, the pressure or tensile force produced brings about the preload on the connected wheel suspension. As an alternative to the compressor, the volume store may be provided, from which only a portion of the pressure fluid can also be supplied to the adjustment element or removed from the adjustment element.

According to a preferred embodiment, the lowering device has a valve which is constructed in an inactive state of the lowering device for connection of a first fluid chamber to a second fluid chamber of the adjustment element in a fluid-conveying manner and/or for at least partially discharging the pressure fluid from the adjustment element into a pressure-free reservoir or into an environment.

This means that the adjustment element in the non-inactive state can be deactivated using the valve by the valve producing a fluid-conveying connection between a first fluid chamber and a second fluid chamber. In this manner, the adjustment element is "short-circuited" so that the piston rod can be moved in an (almost) resistance-free manner in the adjustment element. Depending on the movement direction, the fluid can consequently be urged in one of the two fluid chambers and supplied via the valve to the other fluid chamber in each case. Only a flow resistance in the fluid line brings about a small, negligible movement resistance for the adjustment element.

Additionally or alternatively, the adjustment element may be "ventilated" and consequently switched into a pressure-free state by at least a partial discharge of the pressure fluid from the adjustment element into an environment in the inactive state of the lowering device being enabled. To this end, the valve may produce a connection to the environment in order to discharge excess fluid. This is particularly advantageous when redirecting from one pressure chamber into the other when the volume of the receiving pressure chamber is reduced as a result of a piston rod compared with the other pressure chamber. The connection to the environment may, for example, be carried out purely optionally by means of an auxiliary element in the form of a silencer, an air filter or an air dryer.

In both cases, although in this manner the adjustment element is also moved passively during a compression movement or extension movement of the wheel suspension, no counter-force is produced or the spring excursion influenced. Instead, the respective wheel suspension acts in an uninfluenced manner. This embodiment is—however, in a completely non-limiting manner—suitable in particular for the use of a gaseous pressure fluid, that is to say, in the case of the pneumatic adjustment element.

In any case, the embodiments of the lowering device provided have an advantageous effect on a lowering desired by the driver or restoring of the vehicle height to the original, non-lowered level. In this instance, the "resilient stop" formed by the adjustment element can be readily removed. Accordingly, the vehicle as a result of the spring arrangement can extend rapidly without additionally required auxiliary means.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is explained in greater detail below with reference to a plurality of embodiments and the drawings, in which.

DETAILED DESCRIPTION OF THE DRAWINGS

Figure 1:
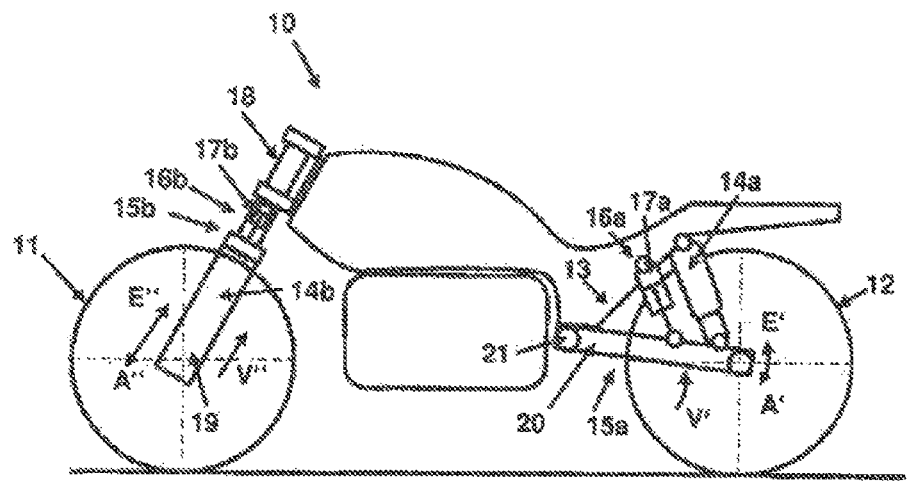
FIG. 1 is a schematic side view of a first embodiment of a motorcycle according to the present invention.

FIG. 1 is a purely schematic side view of a motor vehicle in the form of a motorcycle 10 with a front wheel 11 and a rear wheel 12 and a vehicle frame 13. The motorcycle 10 comprises a rear wheel suspension 15a which is damped by means of a spring arrangement 14a for the rear wheel 12, that is to say, a rear axle suspension 15a. In addition, the motorcycle 10 comprises a front wheel suspension 15b which is damped by means of a second spring arrangement 14b for the front wheel 11, that is to say, a front wheel suspension 15b.

Both damped wheel suspensions 15a, 15b are each constructed for compression in a respective compression direction E', E" and for extension in an opposing respective extension direction A', A". Furthermore, each of the two wheel suspensions 15a, 15b is associated in each case with a lowering device 16a, 16b which can be selectively actuated by means of a pressure fluid. Each of the two lowering devices 16a, 16b is constructed to act in an active state on the associated wheel suspension 15a, 15b with a preload V', V" which is directed in the respective compression direction E', E".

To this end, the respective lowering device 16a, 16b may comprise an adjustment element 17a, 17b, for example, a hydraulically actuatable adjustment element, in particular a hydraulic cylinder, or a pneumatically actuatable adjustment element, in particular a pneumatic cylinder.

The front wheel suspension which is constructed as a front wheel suspension 15b comprises an upper suspension portion 18 and a lower suspension portion 19 which can be moved relative thereto, wherein the spring arrangement 14b comprises at least one spring damper element which is connected at a first end to the lower suspension portion 19 and at an opposing second end to the upper suspension portion 18 for resiliently supporting the lower suspension portion 19 on the upper suspension portion 18.

The associated adjustment element 17b is connected with a first end to the upper suspension portion 18 and with a second end to the lower suspension portion 19 for selectively acting on the damped front wheel suspension 14b with the preload V".

In contrast, the wheel suspension 15a which is constructed as a rear wheel suspension 15a comprises a rear wheel rocker arm 20 which is connected to the vehicle frame 13 so as to be able to be rotated about a first rotation axis 21, wherein the spring arrangement 14a comprises at least one spring damper element which is connected with a first end to the rear wheel rocker arm 20 and with an opposing second end to the vehicle frame 13 in order to resiliently support the rear wheel rocker arm 20.

The associated adjustment element 17a is connected with a first end to the vehicle frame 13 and with a second end to the rear wheel suspension 15a for selectively acting on the rear wheel rocker arm 20 with the preload V'.

As can be seen in FIG. 1, the adjustment element 17a which is associated with the rear wheel suspension 15a is positioned above the rear wheel rocker arm 20 so that the preload V' which is directed in the compression direction E' is provided by a tensile force applied by the adjustment element 17a.

Figure 2:
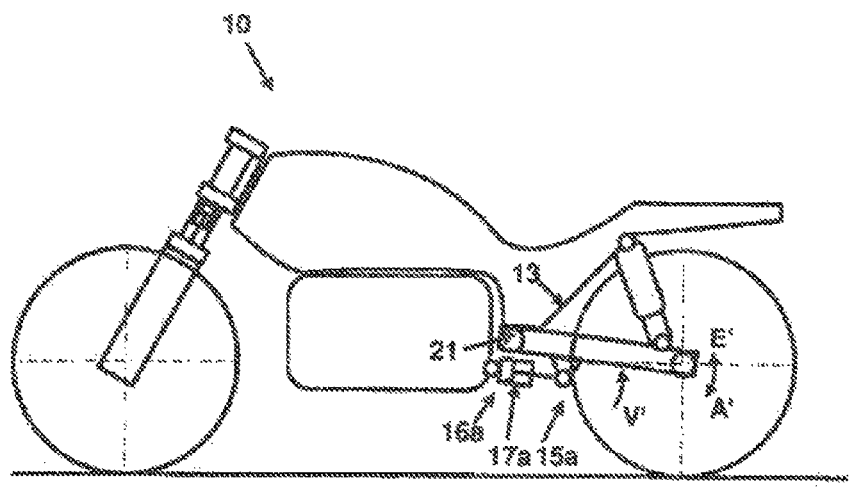
FIG. 2 is a schematic side view of a second embodiment of a motorcycle according to the present invention.

In contrast, FIG. 2 illustrates a second embodiment of the motorcycle 10 which is substantially identical to the first embodiment illustrated in FIG. 1 so that a further description of the corresponding components is dispensed with. In contrast, however, the adjustment element 16a is positioned below the rotation axis 21 of the rear wheel suspension 15a so that the preload V' which is directed in the compression direction E' is provided by means of a pressing force which is applied by the adjustment element 17a. A connection of the adjustment element 17a to the vehicle frame 13 can either be carried out directly or indirectly by means of interposed components.

Figure 3:
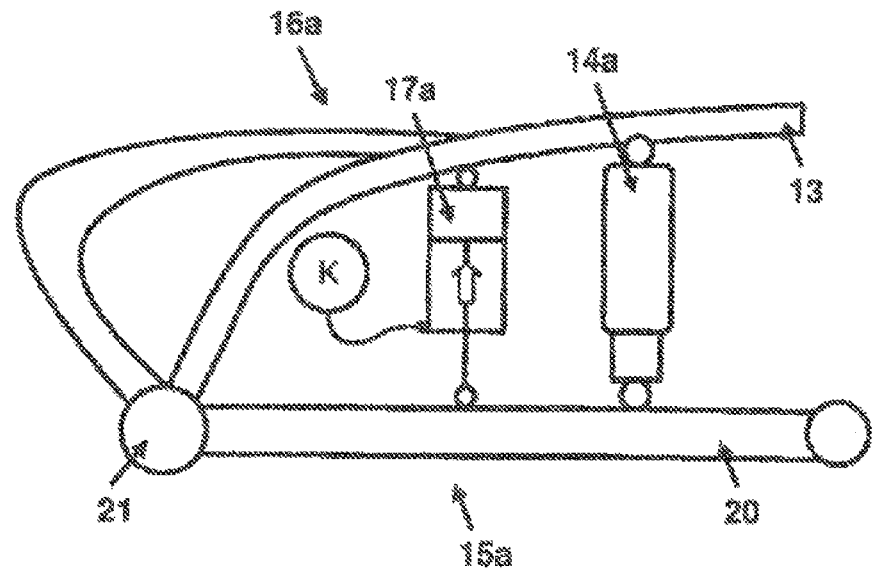
FIG. 3 is a schematic side view of a first embodiment of a rear wheel suspension according to the present invention.

FIG. 3 is a schematic side view of a rear wheel suspension 15a for the motorcycle 10 illustrated in FIG. 1. According to the description relating to FIG. 1, the rear wheel rocker arm 20 is articulated to the vehicle frame 13 so as to be able to be moved in rotation and supported with the spring damper element of the spring arrangement 14a. The lowering device 16a which is constructed separately accordingly comprises a compressor K which is connected to the adjustment element 17a in a fluid-conveying manner for supplying the pressure fluid which is provided for the actuation thereof.

Figure 4:
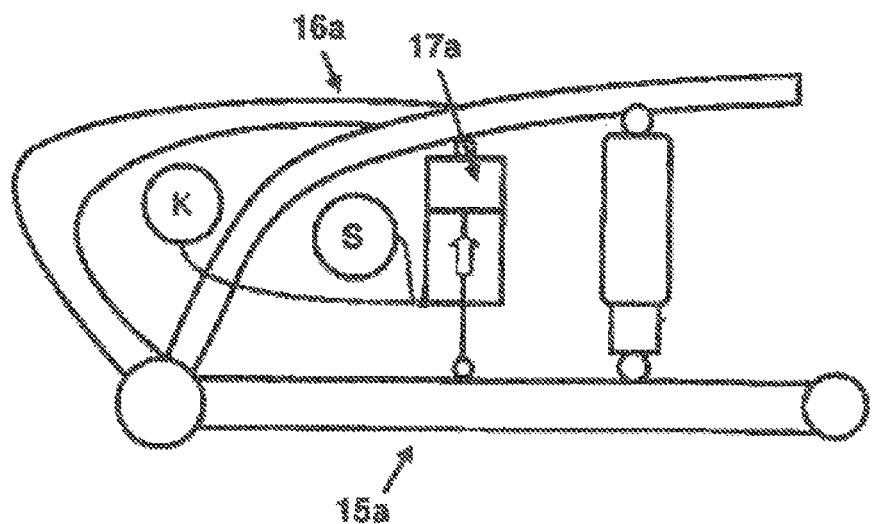
FIG. 4 is a schematic side view of a second embodiment of a rear wheel suspension according to the present invention.

FIG. 4 shows another embodiment of the lowering device 16a which is illustrated in FIG. 3 and which in addition to the compressor K comprises an optional volume store S for actuating the adjustment element 17a by means of the pressure fluid. Using the volume store S, there can be received in the lowering device 16a an additional fluid volume which also enables in the lowered state of the motorcycle 10 particularly comfortable response behavior.

Figure 5:
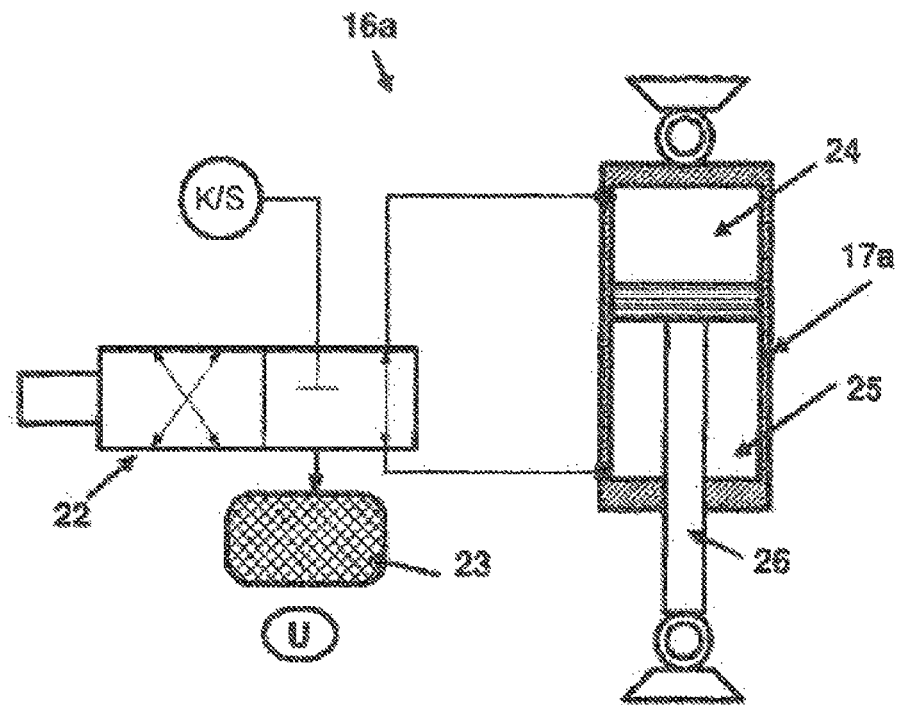
FIG. 5 is a schematic circuit diagram of an embodiment of the lowering device according to the present invention.

FIG. 5 is a schematic circuit diagram of another embodiment of the lowering device 16a. This further comprises in addition to the compressor K and the optional volume store S a valve 22 which, for example, in an active state of the lowering device 16a controls or regulates a supply of the pressure fluid to the adjustment element 17a.

Using the valve 22, the adjustment element 17a can be deactivated in an inactive state by the valve 22 producing a connection between a first fluid chamber 24 and a second fluid chamber 25 in order to enable a fluid exchange between the two fluid chambers 24, 25. In this manner, the adjustment element 17a is "short-circuited" so that the piston rod 26 can be moved in an (almost) resistance-free manner in the adjustment element 17a. To this end, depending on the movement direction, the fluid is urged in one of the two fluid chambers and via the valve supplied to the other fluid chamber. Only a flow resistance in the fluid line brings about a low movement resistance for the adjustment element 17a.

In the active state, however, using the valve one of the two fluid chambers, in this instance: the second fluid chamber 25, is connected to the compressor K and/or the optional volume store V and consequently filled. The other fluid chamber, in this instance: the first fluid chamber 24, is in contrast "ventilated" via the valve 22 and the connection thereof, for example, into an environment U. The connection to the environment U may, for example, be carried out purely optionally via an auxiliary element 23 in the form of a silencer, an air filter or an air dryer.

Figure 6:
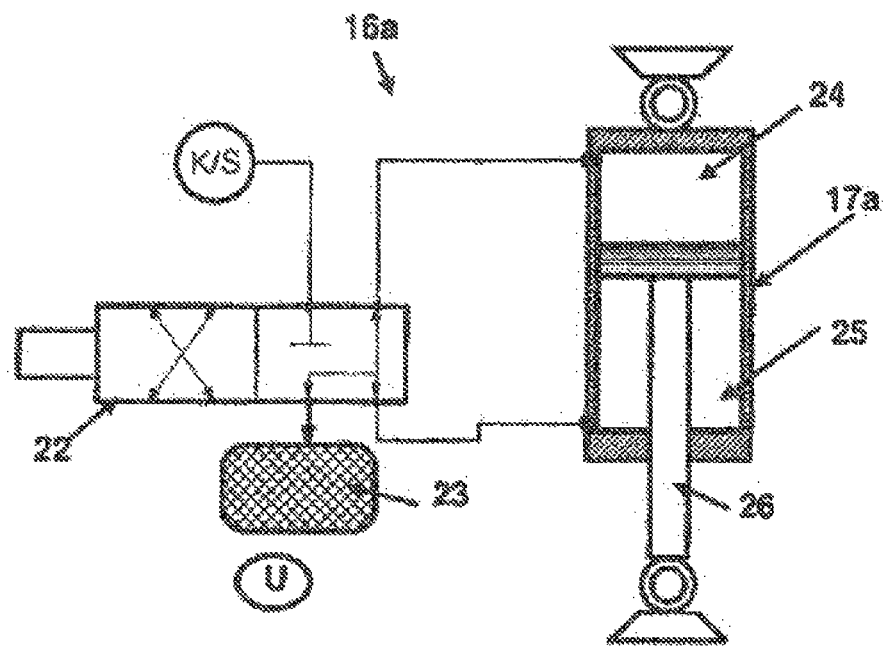
FIG. 6 is a schematic circuit diagram of another embodiment of a lowering device according to the present invention.

FIG. 6 is a schematic circuit diagram of another embodiment of the lowering device 16a. This is constructed in a substantially identical manner to the embodiment illustrated in FIG. 5 so that reference may be made to this description. Components which are identical or which have the same function have the same reference numerals. One difference is that the valve 22 is further constructed in an inactive state of the lowering device 16a for at least partially discharging the pressure fluid from the adjustment element 17a into an environment U.

Using the valve 22, the adjustment element 17a may thus in the inactive state be switched into a pressure-free state by the valve 22 producing a connection between both fluid chambers 24, 25 and the environment U. In this manner, a pressure action by the pressure fluid can be dissipated, in particular in the case of a gaseous pressure fluid. For example, it is thereby possible to discharge excess fluid which when redirected from the first pressure chamber 24 into the second pressure chamber 25, as a result of the volume reduced by the piston rod 26, cannot be received therein.

The connection to the environment U may, for example be carried out in a purely optional manner by means of an auxiliary element 23 in the form of a silencer, an air filter or an air dryer.

In the active state, however, a filling can be carried out in a similar manner to that described in FIG. 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a wheel suspension including a spring arrangement arranged to damp motion of the wheel suspension relative to a frame of the motor vehicle in a compression direction and in an extension direction opposite the compression direction; and
   a lowering device, the lowering device including a lowering device actuator physically remote from and fluidly separate from the spring arrangement of the motion damping wheel suspension, the lowering device being configured to be selectively actuated by a pressure fluid, the pressure fluid being one or both of a gas and a liquid, and to apply a preload in the compression direction between the wheel suspension and the vehicle frame when the lowering device is in an active state to lower the wheel suspension relative to a predetermined wheel suspension height at which the vehicle is operated when the lowering device is not actuated.

2. The motor vehicle as claimed in claim 1, wherein the pressure fluid is a liquid, and
   the lowering device includes a hydraulically actuatable adjustment element.

3. The motor vehicle as claimed in claim 2, wherein the hydraulically actuatable adjustment element is a hydraulic cylinder.

4. The motor vehicle as claimed in claim 2, wherein the hydraulically actuatable adjustment element is one or both of resiliently connected to the vehicle frame and has a resilient piston rod.

5. The motor vehicle as claimed in claim 1, wherein
the pressure fluid is a gas, and
the lowering device includes pneumatically actuatable adjustment element which can be actuated pneumatically.

6. The motor vehicle as claimed in claim 5, wherein
the pneumatically actuatable adjustment element is a pneumatic cylinder.

7. The motor vehicle as claimed in claim 1, wherein
the wheel suspension includes a front wheel suspension for at least one front wheel,
the wheel suspension includes a lower suspension portion movable relative to an upper suspension portion,
the spring arrangement includes at least one front spring damper element connected at a first end to the lower suspension portion and at an opposing second end to the upper suspension portion such that the spring arrangement resiliently supports the lower suspension portion on the upper suspension portion.

8. The motor vehicle as claimed in claim 7, wherein
an adjustment element is connected with a first end to the upper suspension portion and with an opposite second end to the lower suspension portion such that the adjustment element is capable of acting on the front wheel suspension with a front preload force.

9. The motor vehicle as claimed in claim 8, wherein
the wheel suspension includes a rear wheel suspension for at least one rear wheel,
the rear wheel suspension includes a rear wheel rocker arm pivotably connected to the vehicle frame for rotation about a first rotation axis,
the spring arrangement includes at least one rear spring damper element connected at a first end to the rear wheel rocker arm and at an opposing second end to the vehicle frame such that the spring arrangement resiliently supports the lower suspension portion on the upper suspension portion.

10. The motor vehicle as claimed in claim 9, wherein
the adjustment element is connected with a first end to the vehicle frame and with an opposite second end to the rear wheel rocker arm such that the adjustment element is capable of acting on the front wheel suspension with a rear preload force.

11. The motor vehicle as claimed in claim 10, wherein
the adjustment element is positioned either
  below the first rotation axis such that the rear preload directed in the compression direction is a compressive force applied by the adjustment element to the rear wheel rocker arm, or
  above the rear wheel rocker arm such that the rear preload directed in the compression direction is a tensile force applied by the adjustment element to the rear wheel rocker arm.

12. The motor vehicle as claimed in claim 1, wherein
the wheel suspension includes a rear wheel suspension for at least one rear wheel,
the rear wheel suspension includes a rear wheel rocker arm pivotably connected to the vehicle frame for rotation about a first rotation axis,
the spring arrangement includes at least one rear spring damper element connected at a first end to the rear wheel rocker arm and at an opposing second end to the vehicle frame such that the spring arrangement resiliently supports the lower suspension portion on the upper suspension portion.

13. The motor vehicle as claimed in claim 12, wherein
an adjustment element is connected with a first end to the vehicle frame and with an opposite second end to the rear wheel rocker arm such that the adjustment element is capable of acting on the front wheel suspension with a rear preload force.

14. The motor vehicle as claimed in claim 13, wherein
the adjustment element is positioned either
  below the first rotation axis such that the rear preload directed in the compression direction is a compressive force applied by the adjustment element to the rear wheel rocker arm, or
  above the rear wheel rocker arm such that the rear preload directed in the compression direction is a tensile force applied by the adjustment element to the rear wheel rocker arm.

15. The motor vehicle as claimed in claim 1, wherein
the lowering device includes one or both of a compressor and a volume store in fluid communication with the adjustment element.

16. The motor vehicle as claimed in claim 1, wherein
the lowering device includes a valve configured such that when the lowering device is in an inactive state, the valve provides for one or both of:
  fluid communication between a first fluid chamber of the adjustment element to a second fluid chamber of the adjustment element, and
  discharge of the pressure fluid from the adjustment element into a pressure-free reservoir or into an environment in which the motor vehicle is located.

* * * * *